US005519530A

United States Patent [19]
Utsumi

[11] Patent Number: 5,519,530
[45] Date of Patent: May 21, 1996

[54] PEAK COMPRESSION CIRCUIT AND LIGHT TRANSMITTER

[75] Inventor: Kuniaki Utsumi, Sanda, Japan

[73] Assignee: Matsushita Electric Industrial Co., Ltd., Osaka, Japan

[21] Appl. No.: 299,904

[22] Filed: Sep. 1, 1994

[30] Foreign Application Priority Data

Sep. 7, 1993 [JP] Japan .................................. 5-221765
Apr. 5, 1994 [JP] Japan .................................. 6-67029

[51] Int. Cl.$^6$ ............................................ G02F 1/03
[52] U.S. Cl. ......................... 359/264; 359/124; 359/132
[58] Field of Search ............................. 359/124, 132, 359/264

[56] References Cited

U.S. PATENT DOCUMENTS 5,283,679  2/1994  Wedding ................................ 359/154

FOREIGN PATENT DOCUMENTS 0498456  8/1992  European Pat. Off. .
93/05591  3/1993  WIPO .

OTHER PUBLICATIONS

Dr.–Ing. Dieter Schwarzenau & Robert Bosch, "Clipping Effects in Analogue DFB–Transmitters for Fibre–Optic Cable TV Systems", 18th International Television Symposium and Technical Exhibition, Montreux, Switzerland, 10–15 Jun. '93, Publ. Date Oct. 5, 1993, pp. 322–331.
European Search Report.
IEEE Photonics Technology Letters, "Optical Modulation Depth Improvment in SCM Lightwave Systems Using a Dissymmetrization Scheme", vol. 6 No. 6, pp. 750–753, Jun. 1994.
"The Radio Amateur's Handbook", The American Radio Relay League, Inc. 1973.

Primary Examiner—Mark Hellner
Attorney, Agent, or Firm—Ratner & Prestia

[57] ABSTRACT

There is provided a peak compression circuit including detection device for detecting that value of an input signal has exceeded a predetermined set value, a pulse generation device for generating, based on the result of the detection, a pulse signal constituted of frequency components which have no substantial adverse influence on the input signal and having a polarity in a direction of reducing the parts of the input signal exceeding the predetermined set value, a delay device for delaying the input signal so that there is a phase match between the generated pulse signal and the portions of the input signal exceeding the predetermined set value and an addition device for adding the delayed input signal and the pulse signal. There is further provided a light transmitter including the peak compression circuit and a light source for outputting a light signal which has been intensity-modulated by the output signal of the peak compression circuit. This configuration prevents or reduces clipping caused by the characteristics of a circuit or light source connected downstream of the peak compression circuit to suppress deterioration in distortion performance or digital errors.

26 Claims, 13 Drawing Sheets

PEAK COMPRESSION CIRCUIT AND LIGHT TRANSMITTER

BACKGROUND OF THE INVENTION

1. Field of the Invention

The present invention relates to a light transmitter and a peak compression circuit used in optical communication for modulating a light source such as a semiconductor laser and for transmitting a frequency division multiplexed signal or a multiplexed signal of spread spectrum signals. More particularly, the present invention relates to a method of preventing deterioration in performance due to nonlinearity of such a circuit or device.

2. Description of the Related Art

A semiconductor laser has input and output characteristics such that it does not output light when the current of a modulating signal input thereto is below a certain threshold. Therefore, the modulating signal current of a semiconductor laser which is a frequency division multiplexed signal or a multiplexed signal of spread spectrum signals is not converted into an output light signal where it falls below the threshold of the semiconductor laser. In other words, the parts of the modulating current below the threshold of the semiconductor laser are lost instead of being converted into an output light signal. This phenomenon is referred to as "clipping".

When a frequency division multiplexed signal or a multiplexed signal of spread spectrum signals is optically transmitted, transmission channels are normally set so that the optical modulation index of those channels will total at 100% or more. Therefore, there is a possibility of clipping which is a phenomenon that a modulating current momentarily falls below the threshold of a semiconductor laser, although the probability is low. Clipping results not only in loss of the information included in the portion wherein it has occurred but also in distortion which degrades the performance. In the case of a digital modulating signal, clipping creates another problem in that it generates digital errors. Further, the problem as described above will be encountered also in light modulators for modulating unmodulated light, LEDs and the like because they have a point having no linearity for the input and output characteristics thereof which is comparable to the threshold of a semi-conductor laser.

Such a phenomenon can occur also in electrical amplifiers wherein the input and output characteristics are linear in a limited portion and in other portions the characteristics are non-linear. The only difference between these two case is that the transition at the boundaries of such portions is steep for a semiconductor laser while the transition normally proceeds gradually in an electrical amplifier. Therefore, the problem as described above exists also in an electrical amplifier or the like where the input signal is susceptible to nonlinearity because its magnitude is large.

Such deterioration in performance is described in papers such as A. A. M. Saleh, "Fundamental Limit on Number of Channels in Subcarrier-Multiplexed Lightwave CATV System", Electron. Lett., Vol. 25, pp. 776–777, but there has been no report on how to reduce deterioration due to clipping.

SUMMARY OF THE INVENTION

The present invention confronts such a problem in a semiconductor laser, electrical amplifier and the like as described above, and it is an object of the present invention to provide a light transmitter and a peak compression circuit wherein the occurrence of clipping is avoided or the level of clipping is reduced to suppress deterioration in distortion characteristics or digital errors.

According to the present invention, there is provided a peak compression circuit including a detection means for detecting that the value of an input signal exceeds a predetermined set value, a pulse generation means for generating, based on the result of the detection, a pulse signal constituted of frequency components which have no substantial adverse influence on the input signal and having a polarity in the direction of reducing the parts of the input signal exceeding a predetermined set value, a delay means for delaying the input signal so that there is a phase match between the generated pulse signal and the input signal components exceeding the predetermined set value and an addition means for adding the delayed input signal and the pulse signal.

According to the present invention, there is provided a transmitter which includes the above-described peak compression circuit and a signal output means for outputting a signal whose strength has been modulated in accordance with the output signal of the peak compression circuit and in which the predetermined set value depends on the capability of the signal output means.

According to the present invention, for example, the detecting means detects that the value of an input signal exceeds a predetermined set value which depends on the capability of the light signal output means; based on the result of the detection, the pulse generation means generates a pulse signal constituted of frequency components which do not substantially adversely affect the input signal and having a polarity in the direction of reducing the portions of the input signal exceeding a predetermined set value; the delay means delays the input signal so that there is a phase match between the generated pulse signal and the portions of the input signal exceeding the predetermined; the addition means adds the delayed input signal and the pulse signal; and the light signal output means outputs a light signal whose strength has been modulated in accordance with the result of the addition by the addition means.

It is apparent from the above description that the light transmitter according to the present invention provides an advantage that the occurrence of clipping associated with the characteristics of a light source is avoided or the degree of clipping is reduced to suppress deterioration in distortion characteristics or digital errors.

The peak compression circuit according to the present invention provides an advantage in that generation of non-linear distortion at the downstream of the circuit can be reduced.

DETAILED DESCRIPTION OF PREFERRED EMBODIMENTS

The present invention will now be described with reference to the accompanying drawings showing preferred embodiments thereof.

Figure 1:
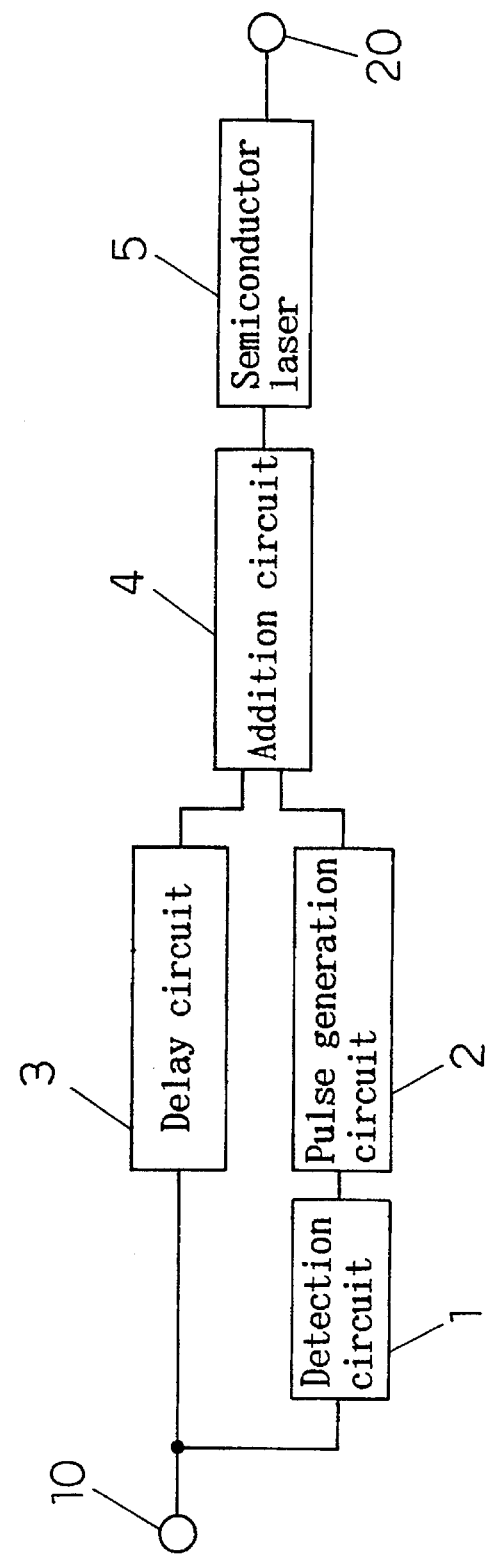
FIG. 1 is a block diagram showing a configuration of a light transmitter according to a first embodiment of the present invention.

FIG. 1 is a block diagram showing a configuration of a light transmitter according to a first embodiment of the present invention. In FIG. 1, 1 designates a detection circuit for detecting that an instantaneous amplitude of an input signal 10 has exceeded a predetermined set value; 2 designates a pulse generation circuit for generating a pulse signal based on the result of the detection by the detection circuit 1; 3 designates a delay circuit for delaying the input signal 10; 4 designates an addition circuit for adding the pulse signal and the delayed input signal; 5 designates a semiconductor laser which is driven by the signal obtained by the addition; and 20 designates an output light signal by the semiconductor laser 5. In the present invention, the input signal 10 is assumed to be a frequency division multiplexed signal or a multiplexed signal of spread spectrum signals. The predetermined set value is a value which depends on the capability of the light signal output means and, in this case, it depends on the threshold of the semiconductor laser 5.

Operations of the light transmitter according to the first embodiment will now be described with reference to the drawings.

First, the detection circuit 1 detects that an instantaneous amplitude of the input signal 10 has exceeded the predetermined set value and outputs the information to the pulse generation circuit 2 (for convenience in description, the detection is made when the amplitude falls below the set value in the present embodiment, but it essentially works equivalently when the amplitude does not fall below the set value, the only difference being the polarity). As a result, the pulse generation circuit 2 generates a pulse signal. This pulse signal is a low frequency signal whose frequency spectrum does not overlap the input signal 10. On the other hand, the input signal 10 is delayed by the delay circuit 3 so that the portions thereof wherein the amplitude instantaneously falls below the predetermined set value are phase-matched to the pulses of the pulse signal, then added with the pulse signal at the addition circuit 4 and input to the semiconductor laser 5.

The operation as described above will be described with reference to the waveforms shown in FIG. 2(a), FIG. 2(b), FIG. 2(c) and FIG. 2(d).

Figure 2A:
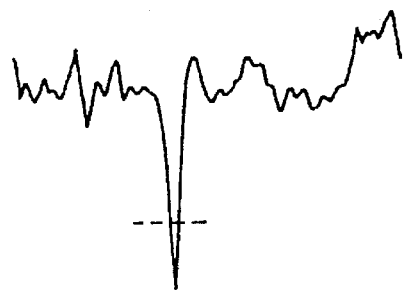
FIG. 2(a) illustrates an example of a waveform for explaining an operation of the first embodiment of the present invention.
Figure 2B:
FIG. 2(b) illustrates an example of a waveform for explaining an operation of the first embodiment of the present invention.
Figure 2C:
FIG. 2(c) illustrates an example of a waveform for explaining an operation of the first embodiment of the present invention.
Figure 2D:
FIG. 2(d) illustrates an example of a waveform for explaining an operation of the first embodiment of the present invention.

When the input signal 10 shown in FIG. 2(a) falls below the predetermined set value in the detection circuit 1 (indicated by the broken line in FIG. 2(a)), the detection circuit 1 detects it and outputs the result of the detection to the pulse generation circuit 2. Next, the pulse generation circuit 2 generates a pulse signal as shown in FIG. 2(b). On the other hand, the input signal 10 is delayed by the delay circuit 3 as shown in FIG. 2(c). The purpose is to compensate for a delay in the pulse signal from the input signal 10 by the time required for the generation of the pulse signal after the detection by the detection circuit 1. This delay causes a phase match between the positions of the pulses of the pulse signal and the positions of the input signal 10 wherein it falls below the set value. Next, the pulse signal shown in FIG. 2(b) and the delayed input signal shown in FIG. 2(c) are added by the addition circuit 4. In the output of the addition circuit 4, i.e., a modulating signal of the semiconductor laser 5, the peak value of the portions of the input signal 10 below the set value is reduced as shown in FIG. 2(d), which results in a reduction in the possibility of clipping in the semiconductor laser 5.

If the input signal 10 has a peak value which is so large that it can not be completely compensated by the magnitude of the pulse signal, clipping can not be completely prevented, but the level of the clipping can be reduced. Since a smaller peak value will appear with much higher probability, there is no need for generating pulses having such a great magnitude from the viewpoint of the effectiveness. On the contrary, it should be noted that too large pulses can cause clipping or saturation of the opposite polarity. If a signal which is fairly large in magnitude and which has low saturation characteristics can be input without problem, the magnitude of the pulse signal can be increased accordingly. The magnitude of the pulses may be determined depending on the optical modulation index. In general, the magnitude of the pulses must be larger, the larger the optical modulation index.

On the other hand, the receiving end receives this output light signal 20. Since the pulse signal is a low frequency signal whose frequency spectrum does not overlap the input signal 10, reception and demodulation can be done without any influence of the pulse signal because no modification is required at the receiving end, unlike the case wherein the pulse signal is not added.

As described above, since the present embodiment is to be used only for a semiconductor laser, it is only necessary to generate a pulse signal of one polarity and the detection circuit 1 is required only to detect whether the input signal exceeds one set value. It is therefore possible to reduce the influence of clipping with a simple circuit configuration.

Further, since a light emitting diode has input and output characteristics similar to those of a semiconductor laser, the same configuration as in this embodiment is applicable where a light emitting diode is used as the light source. The configuration in the present embodiment is also effective for a light source having input and output characteristics which include one threshold like a semiconductor laser.

Figure 3:
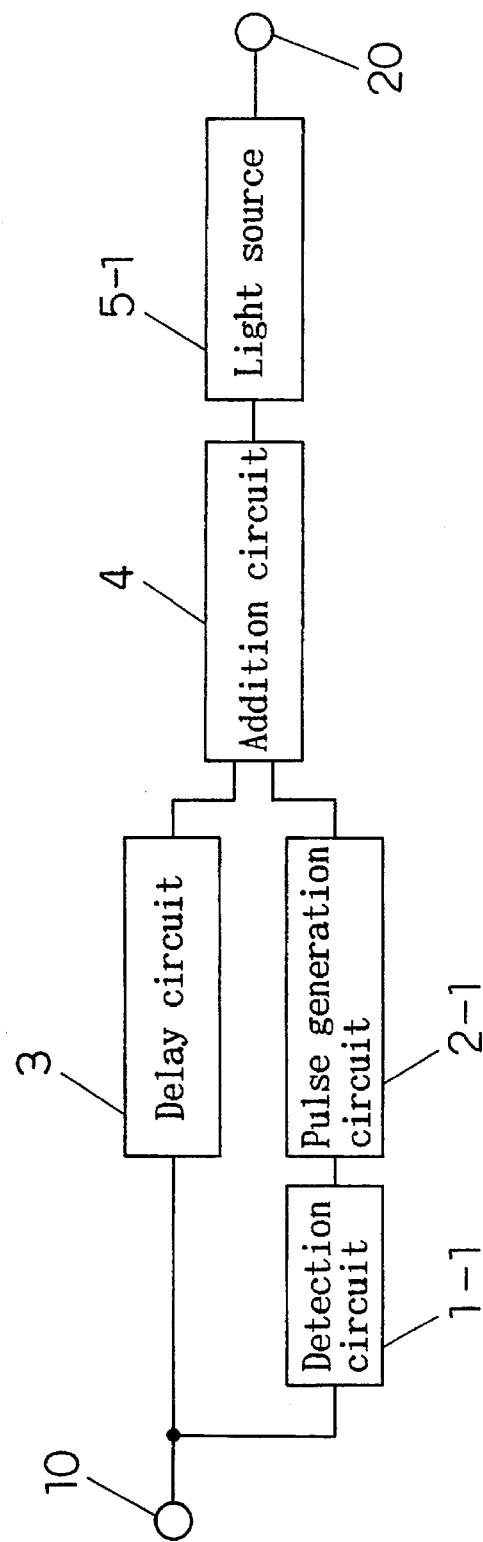
FIG. 3 is a block diagram showing a configuration of a light transmitter according to a second embodiment of the present invention.
Figure 5:
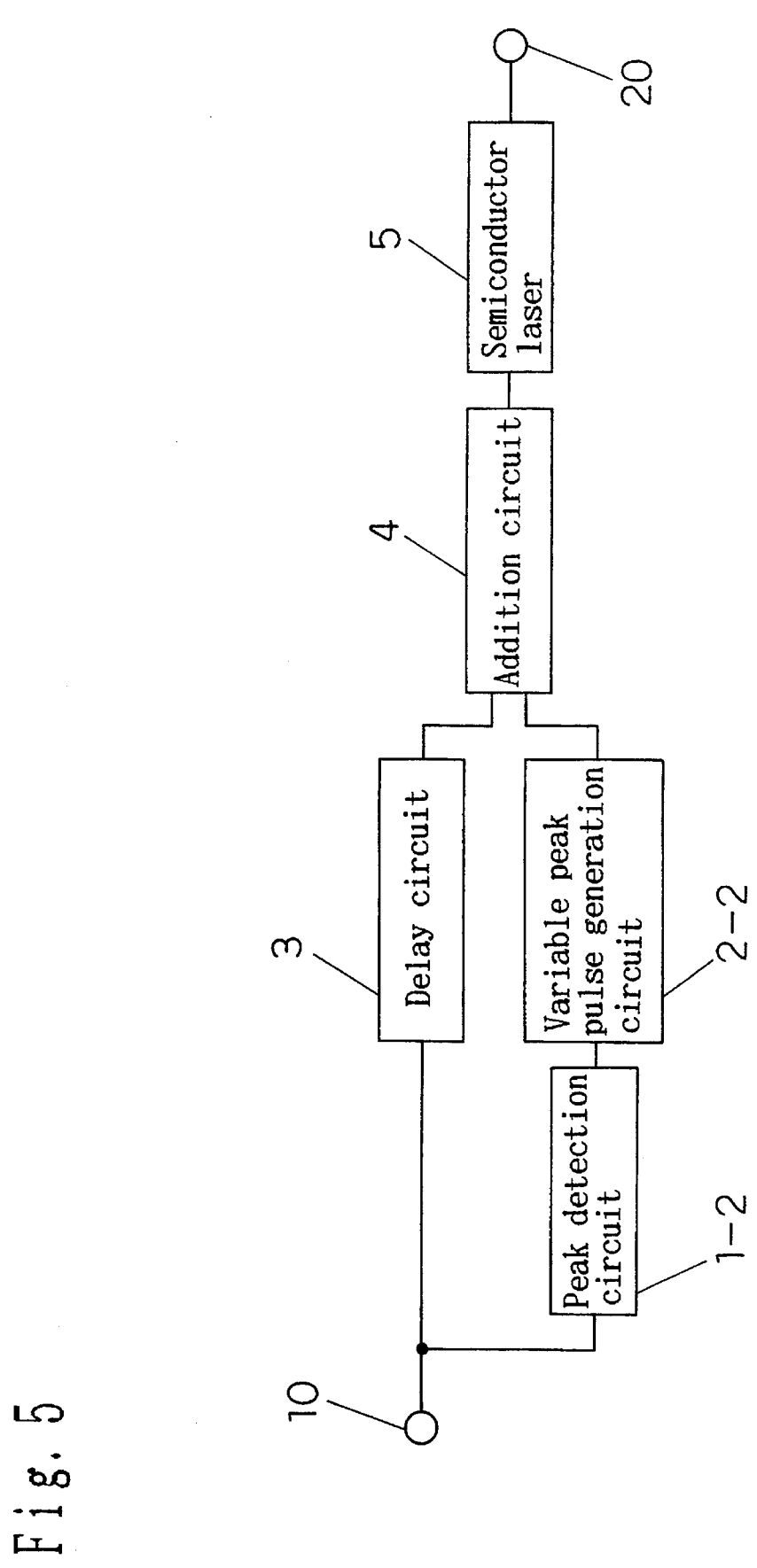
FIG. 5 is a block diagram showing a configuration of a light transmitter according to a third embodiment of the present invention.

FIG. 3 is a block diagram showing a configuration of a light transmitter according to a second embodiment of the present invention. The difference between the second and the first embodiments exists only in the light source, detection circuit and pulse generation circuit. In FIG. 3, 5-1 designates a light source; 1-1 designates a detection circuit; 2-1 designates a pulse generation circuit; and like reference numbers designate parts identical to those in FIG. 1.

The light source 5-1 is a combination of a light source such as a stabilized light source and an external light modulator of a waveguide type wherein clipping occurs at both of the upper and lower poles thereof. To be exact, since an external light modulator has input and output characteristics which are periodic function, the clipping is not complete and folding occurs instead, which also causes distortion and can be treated in the same way as for clipping because it is also to be prevented like clipping. The detection circuit 1-1 is a detection circuit which has two set values as detection levels and outputs a signal when an input signal exceeds the first set value and when it falls below the second set value. One of the two set values is provided for the positive polarity of the input signal and the other for the negative polarity in accordance with the capability of the light source 5-2 as the light signal outputting means. The pulse generation circuit 2-1 is responsive to the detection circuit 1-1 and generates a pulse signal of the positive polarity when the input signal exceeds the first set value in the detection circuit 1-1 and a pulse signal of the negative polarity when the input signal falls below the second set value. The detection circuit 1-1 is substantially equivalent to an arrangement wherein two units of the detection circuit 1 in the first embodiment are provided in parallel and wherein the detection circuits have set values of different polarities. Further, the pulse generation circuit 2-1 may be considered as an arrangement wherein two units of the pulse generation circuit 2 in the first embodiment are provided to generate pulse signals of different polarities.

The operation of the light transmitter according to the second embodiment will now be described with reference to the drawings.

First, when an instantaneous amplitude of the input signal 10 exceeds the first set value in the detection circuit 1-1, the detection circuit 1-1 detects it and outputs such information to the pulse generation circuit 2-1. Then, the pulse generation circuit 2-1 generates the pulse signal of the negative polarity. When an instantaneous amplitude of the input signal 10 falls below the second set value in the detection circuit 1-1, the detection circuit 1-1 detects it and outputs such information to the pulse generation circuit 2-1. Then, the pulse generation circuit 2-1 generates the pulse signal of the positive polarity. Those pulse signals are low frequency signals whose frequency spectra do not overlap the input signal 10. On the other hand, the input signal 10 is delayed by the delay circuit 3 so that there is a phase match between the portions of the instantaneous amplitudes exceeding the set values and the pulses of the pulse signals, added with the pulse signals at the addition circuit 4 and is input to the light source 5-1.

The operation as described above will now be described with reference to the waveform diagrams shown in FIG. 4(a), FIG. 4(b), FIG. 4(c) and FIG. 4(d).

Figure 4A:
FIG. 4(a) illustrates an example of a waveform for explaining an operation of the second embodiment of the present invention.
Figure 4B:
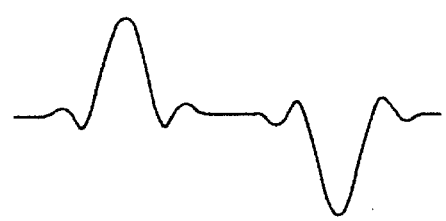
FIG. 4(b) illustrates an example of a waveform for explaining an operation of the second embodiment of the present invention.
Figure 4C:
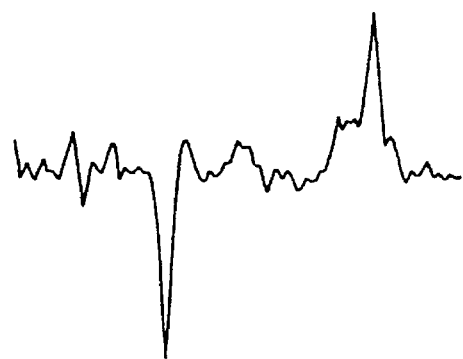
FIG. 4(c) illustrates an example of a waveform for explaining an operation of the second embodiment of the present invention.
Figure 4D:
FIG. 4(d) illustrates an example of a waveform for explaining an operation of the second embodiment of the present invention.

First, when the input signal 10 shown in FIG. 4(a) falls below the first set value in the detection circuit 1-1 (indicated by the broken line in FIG. 4(a)), the detection circuit 1-1 detects it and outputs the result of the detection to the pulse generation circuit 2-1 which in turn outputs a first pulse signal having the positive polarity as shown in FIG. 4(b). When the input signal 10 exceeds the second set value in the detection circuit 1-1 (indicated by the chain line in FIG. 4(a)), the detection circuit 1-1 detects it and outputs the result of the detection to the pulse generation circuit 2-1 which in turn outputs a second pulse signal having the negative polarity as shown in FIG. 4(b). On the other hand, the input signal 10 is delayed by the delay circuit 3 so that the positions of its amplitude exceeding the set values agree with corresponding positions of the pulse signals. The purpose is to compensate for a delay in the pulse signals from the input signal 10 by a time interval required for the generation of the pulse signals after the detection by the detection circuit 1-1. This delay provides a phase match between the positions of the pulses of the pulse signals and the positions of the input signal falling below the first set value and exceeding the second set value. Next, the pulse signal shown in FIG. 4(b) and the delayed input signal shown in FIG. 4(c) are added by the addition circuit 4. In the output of the addition circuit 4, i.e., the modulating signal of the light source 5-1, the peak values of the portions of the input signal 10 falling below the first set value and exceeding the second set value are reduced as shown in FIG. 4(d), and the possibility of clipping at the light source 5-1 is thus reduced.

At this time, if the input signal 10 has large peak values which is too large to be completely compensated by the magnitude of the pulse signals, clipping can not be completely eliminated, but the level of clipping can be reduced.

As described above, according to the present invention, the level of clipping can be reduced by generating pulse signals having polarities opposite to the polarities of peaks exceeding two set values. The present embodiment is therefore effective for a light source wherein clipping occurs with both polarities.

Light sources such as a semiconductor laser and a light emitting diode wherein unipolar clipping occurs exhibit saturation characteristics against large driving current. Since such saturation characteristics cause a kind of clipping, such light sources are to be treated as light sources having bipolar clipping if they are driven under conditions that such a saturation area is also used and that the configuration of a light transmitter as in the present embodiment must be employed.

The magnitude of the pulse signals may be considered as the same as in the first embodiment. There is no need for making any change to the receiving end in the first embodiment to implement the present embodiment.

FIG. 5 is a block diagram showing a configuration of a light transmitter according to a third embodiment of the present invention. The difference between the third and first embodiments exists only in the detection circuit and the pulse generation circuit. In FIG. 5, 1-2 designates a peak detection circuit for detecting that an input signal 10 exceeds a predetermined set value and for detecting the peak value at that time; 2-2 designates a variable peak pulse generation circuit for generating a variable peak pulse signal in accordance with the output of the peak detection circuit; and like reference numbers designate parts identical to those in the first embodiment.

The operation of the light transmitter according to the third embodiment will now be described with reference to the drawings.

First, the detection circuit 1-2 detects that an instantaneous amplitude of the input signal 10 has exceeded the predetermined set value (for convenience in description, the detection is made when the amplitude falls below the set value in the present embodiment, although it essentially works equivalently, the only difference being the polarity), detects the peak value of the input signal 10 and then outputs this information to the variable peak pulse generation circuit 2-2. As a result, the peak variable pulse generation circuit 2-2 generates variable peak pulse signals having magnitude corresponding to the peak value of the input signal 10. The variable peak pulse signals are low frequency signals whose frequency spectra do not overlap those of the input signals 10. On the other hand, the input signal 10 is delayed by the delay circuit 3 so that the portions thereof wherein the amplitude instantaneously falls below the predetermined set value are phase-matched to the pulses of the variable peak pulse signals, added with the variable peak pulse signals at the addition circuit 4 and input to the semiconductor laser 5.

The operation as described above will be described with reference to the waveforms shown in FIG. 6(a), FIG. 6(b), FIG. 6(c) and FIG. 6(d).

Figure 6A:
FIG. 6(a) illustrates an example of a waveform for explaining an operation of the third embodiment of the present invention.
Figure 6B:
FIG. 6(b) illustrates an example of a waveform for explaining an operation of the third embodiment of the present invention.
Figure 6C:
FIG. 6(c) illustrates an example of a waveform for explaining an operation of the third embodiment of the present invention.
Figure 6D:
FIG. 6(d) illustrates an example of a waveform for explaining an operation of the third embodiment of the present invention.

When the input signal 10 shown in FIG. 6(a) falls below the predetermined value set in the peak detection circuit 1-2 (in FIG. 6(a), the set value is indicated by the broken line, and examples of two different peak values are shown), the detection circuit 1-2 detects it and, at the same time detects the peak values of the input signal 10, the result of the detection being output to the variable peak pulse generation circuit 2-2. The variable peak pulse generation circuit 2-2 generates a variable peak pulse signal as shown in FIG. 6(b). The second portion of the input signal below the set value is larger, and the second pulse of the variable peak pulse signal is larger accordingly in the waveform shown in FIG. 6(b). On the other hand, the input signal 10 is delayed by the delay circuit 3 as shown in FIG. 6(c). The purpose is to compensate for a delay of the pulse signal from the input signal 10 by the time required for the generation of the variable peak pulse signal after the detection by the peak detection circuit 1-2. This delay causes a phase match between the positions of the pulses of the variable peak pulse signal and the positions of the input signal 10 wherein it falls below the set value. Next, the variable peak pulse signal shown in FIG. 6(b) and the delayed input signal shown in FIG. 6(c) are added by the addition circuit 4. In the output of the addition circuit 4, i.e., a modulating signal of the semiconductor laser 5, the peak value of the portions of the input signal 10 below the set value is reduced as shown in FIG. 6(d), which results in a reduction in the possibility of clipping in the semiconductor laser 5.

If the input signal 10 has a peak value which is so large that it can not be completely compensated by the magnitude of the variable peak pulse signal, clipping can not be completely prevented, but the level of the clipping can be reduced. This results in a more significant advantage than that in the first embodiment. If small peak values will appear with much higher probability, there is a possibility that a too large pulse signal causes clipping or saturation with opposite polarities in the first embodiment. On the other hand the present embodiment prevents this by employing the peak values of the pulse signal variable relative to the input signal 10. The maximum peak value of the variable peak pulse signal must be set so that a light modulation factor of approximately 50% will be obtained because clipping of the opposite polarity can be caused if the optical modulation index is larger than this. However, if the saturation characteristic is small and a fairly large signal can be input without problem, the magnitude of the pulse signal can be increased accordingly.

As described above, the present embodiment is to be used only for a semiconductor laser, it is only necessary to generate a variable peak pulse signal of one polarity having magnitude corresponding to the peak value of the input signal. As a result, there is an advantage not only in that clipping can be effectively prevented but also in that it is possible to prevent or reduce clipping and saturation of the opposite polarity due to a pulse signal which is too large relative to the peak value of the input signal.

As described with reference to the first embodiment, there is no need for making changes at the receiving end for the present embodiment.

Further, since a light emitting diode has input and output characteristics similar to those of a semiconductor laser, the same configuration as in this embodiment is applicable where a light emitting diode is used as the light source. The configuration of the present embodiment is also effective for a light source having input and output characteristics which include one threshold like a semiconductor laser.

Figure 7:
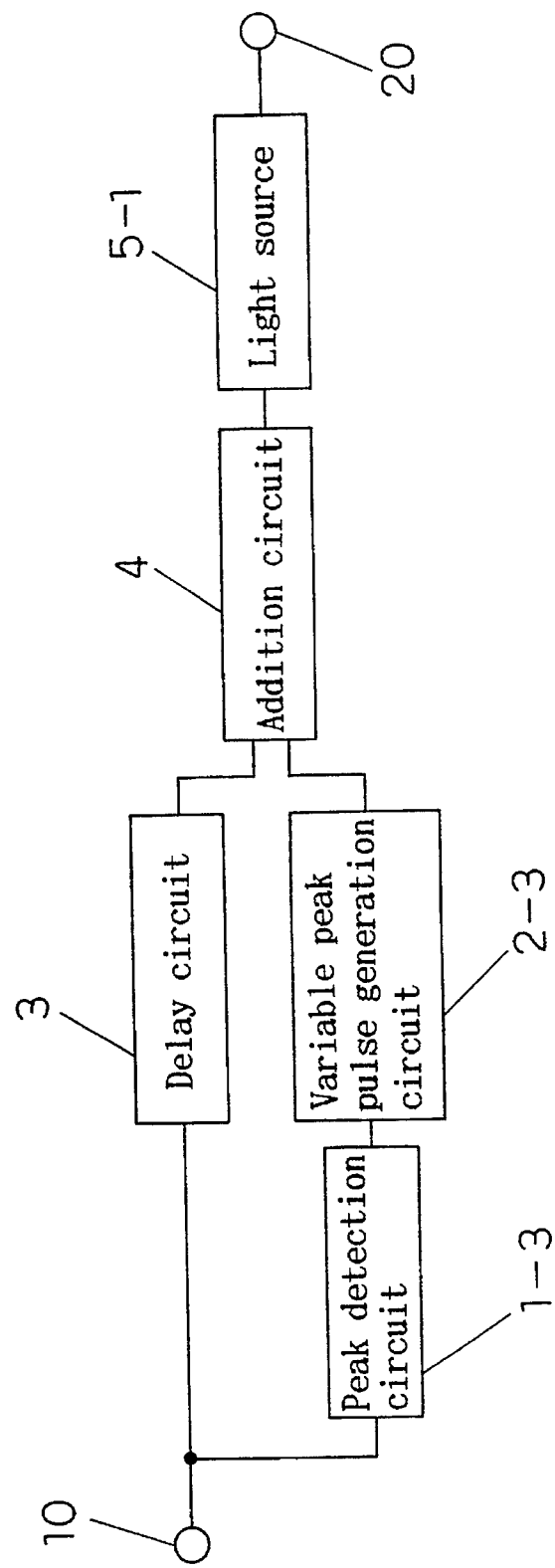
FIG. 7 is a block diagram showing a configuration of a light transmitter according to a fourth embodiment of the present invention.

FIG. 7 is a block diagram showing a configuration of a light transmitter according to a fourth embodiment of the present invention. The difference between the fourth and second embodiments exists only in the detection circuit and the pulse generation circuit. In FIG. 7, 1-3 designates a peak detection circuit; 2-3 designates a variable peak pulse generation circuit; and like reference numbers designate parts identical to those in FIG. 3.

The peak detection circuit 1-3 is a detection circuit which has two set values as detection levels, detects that an input signal exceeds the first set value and that it falls below the second set value, detects those peak values at the same time and outputs such information. The variable peak pulse generation circuit 2-3 is responsive to the peak detection circuit 1-3 and generates a variable peak pulse signal of the negative polarity when the input signal 10 exceeds the first set value and a variable peak pulse signal of the positive polarity when the input signal 10 falls below the second set value. The magnitude of the variable peak pulse signals corresponds to the detected peak values as in the above-described third embodiment. The peak detection circuit 1-3 is substantially equivalent to an arrangement wherein two units of the peak detection circuit 1-2 in the third embodiment are provided in parallel and wherein the peak detection circuits have set values of different polarities. Further, the variable peak pulse generation circuit 2-3 may be considered as an arrangement wherein two units of the variable peak pulse generation circuit 2-2 in the third embodiment are provided to generate pulse signals of different polarities.

The operation of the light transmitter according to the fourth embodiment will now be described with reference to the drawings.

First, when an instantaneous amplitude of the input signal 10 exceeds the first set value in the detection circuit 1-3, the detection circuit 1-3 detects it and outputs such information to the variable peak pulse generation circuit 2-3. Then, the variable peak pulse generation circuit 2-3 generates the pulse signal of the negative polarity having magnitude corresponding to the peak value. When an instantaneous amplitude of the input signal 10 falls below the second set value in the detection circuit 1-3, the detection circuit 1-3 detects it and outputs such information to the variable peak pulse generation circuit 2-3. Then, the pulse generation circuit 2-3 generates the pulse signal of the positive polarity having magnitude corresponding to the peak value. Those variable peak pulse signals are low frequency signals whose frequency spectra do not overlap the input signal 10. On the other hand, the input signal 10 is delayed by the delay circuit 3 so that there is a phase match between the portions of the instantaneous amplitudes exceeding the set values and the positions of the pulses of the variable peak pulse signals, added with the variable peak pulse signals at the addition circuit 4 and is input to the light source 5-1.

The operation as described above will now be described with reference to the waveform diagrams shown in FIG. 8(a), FIG. 8(b), FIG. 8(c) and FIG. 8(d).

Figure 8A:
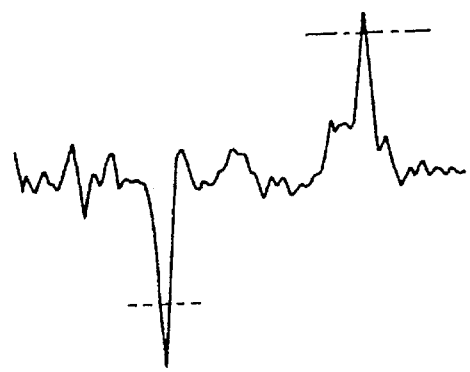
FIG. 8(a) illustrates an example of a waveform for explaining an operation of the fourth embodiment of the present invention.
Figure 8B:
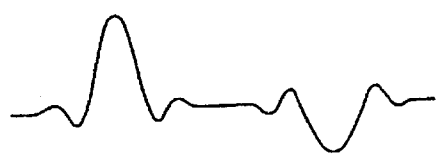
FIG. 8(b) illustrates an example of a waveform for explaining an operation of the fourth embodiment of the present invention.
Figure 8C:
FIG. 8(c) illustrates an example of a waveform for explaining an operation of the fourth embodiment of the present invention.
Figure 8D:
FIG. 8(d) illustrates an example of a waveform for explaining an operation of the fourth embodiment of the present invention.

First, when the input signal 10 shown in FIG. 8(a) falls below the first set value in the detection circuit 1-3 (indicated by the broken line in FIG. 8(a)), the detection circuit 1-3 detects it, detects the peak value at that time and outputs the result of the detection to the variable peak pulse generation circuit 2-3 which in turn generates a first variable peak pulse signal of the positive polarity as shown in FIG. 8(b). When the input signal 10 exceeds the second set value in the detection circuit 1-3 (indicated by the chain line in FIG. 8(a)), the detection circuit 1-3 detects it and detects the peak value at that time. Then, the variable peak pulse generation circuit 2-3 generates a second variable peak pulse signal having the negative polarity as shown in FIG. 8(b). Since the portion of the input signal 10 exceeding the second set value is smaller in FIG. 8(a), it is apparent from FIG. 8(b) that the magnitude of the variable peak pulse signal of the negative polarity is smaller than that of the signal of the positive polarity. On the other hand, the input signal 10 is delayed by the delay circuit 3 as shown in FIG. 8(c). The purpose is to compensate for a delay in the variable peak pulse signals from the input signal 10 by a time interval required for the generation of the variable peak pulse signals after the detection by the detection circuit 1-3. This delay provides a phase match between the positions of the pulses of the variable peak pulse signals and the positions of the input signal falling below the first set value and exceeding the second set value. Next, the variable peak pulse signal shown in FIG. 8(b) and the delayed input signal shown in FIG. 8(c) are added by the addition circuit 4. In the output of the addition circuit 4, i.e., the modulating signal of the light source 5-1, the peak values of the portions of the input signal 10 falling below the first set value and exceeding the second set value are reduced as shown in FIG. 8(d), and the possibility of clipping at the light source 5-1 is thus reduced.

At this time, if the input signal 10 has large peak values which are too large to be completely compensated by the magnitude of the pulse signals, clipping can not be completely prevented, but the level of the clipping can be reduced. This results in a more significant advantage than that in the second embodiment. If small peak values will appear with much higher probability, there is a possibility that a too large pulse signal causes clipping or saturation of the opposite polarity. The present embodiment prevents this by employing the peak values of the pulse signal variable relative to the input signal 10. The maximum peak value of the variable peak pulse signal must be set so that a optical modulation index of approximately 50% will be obtained because clipping of the opposite polarity can be caused if the optical modulation index is larger than this.

As described above, according to the present invention, the level of clipping can be reduced by generating pulses having polarities opposite to the polarities of peaks exceeding two set values. The present embodiment is therefore effective for a light source such that clipping occurs with both polarities.

The magnitude of the variable peak pulse signals may be considered as the same as in the first embodiment. There is no need for making any change to the receiving end in the first embodiment to implement the present embodiment.

As described above, it is essential to the present invention that the pulse signals are low frequency signals whose frequency spectra do not overlap an input signal. The reason is that the application of the pulse signals should not cause any deterioration in the input signal and, in general, it is difficult to return a deteriorated signal to the initial state.

Although it is assumed that the input signal 10 is a frequency division multiplexed signal or a multiplexed signal of spread spectrum signals in the above-described embodiment, the present invention is not limited thereto and it is possible to employ a signal such that clipping occurs in the form of an impulse, uncontinuously.

A description will now be made on a circuit for generating a pulse signal having frequency characteristics which do not adversely affect an input signal.

Figure 9:
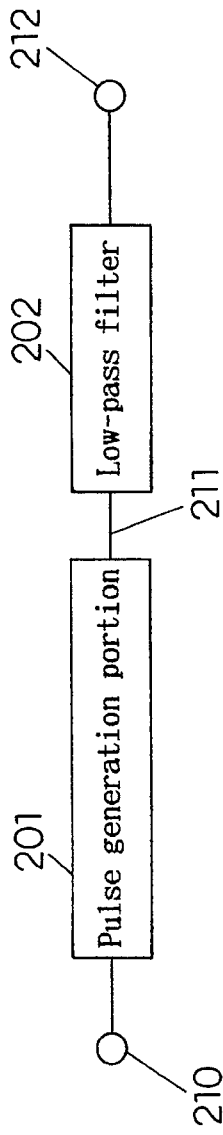
FIG. 9 is a block diagram showing an example of a configuration of a pulse generation circuit.

FIG. 9 is a block diagram showing an example of a configuration of a pulse generation circuit. In FIG. 9, 201 designates a pulse generation portion; 202 designates a low-pass filter; 210 designates an input of the pulse generation portion; 211 designates an output of the pulse generation portion; and 212 designates an output of the low-pass filter.

The operation of the pulse generation circuit will now be described.

Figure 14:
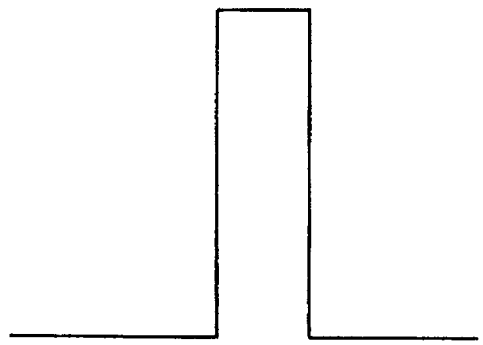
FIG. 14 is a diagram showing a waveform of 211 in FIG. 9.
Figure 15:
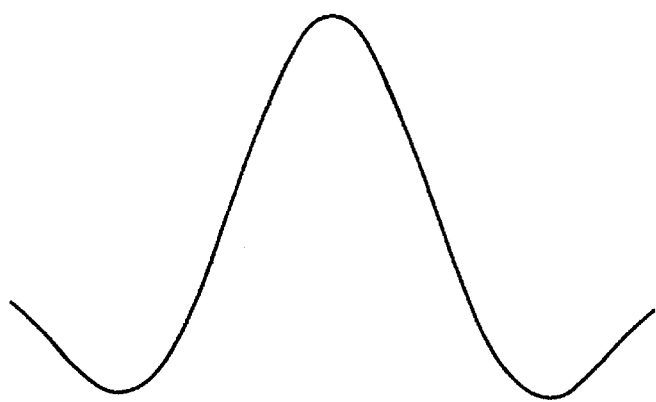
FIG. 15 is a diagram showing a waveform of 212 in FIG. 9.

The output of the detection circuit or peak detection circuit in the above-described embodiments constitutes the input 210 of the pulse generation portion 201 which generates a rectangular pulse as the output 211 thereof (See FIG. 14). However, since a rectangular pulse includes very high frequency components, it will adversely affect the input signal as it is. In order that the input signal will not be affected, it is necessary to remove at least the components in the same frequency band as that of the input signal. The low-pass filter 202 performs this function to provide a pulse signal which does not affect the frequency band of the input signal as the output 212 of the low-pass filter (See FIG. 15).

In order to sufficiently attenuate and remove the frequency components with only the low-pass filter 202, it is necessary to use a high performance filter or to set a low cutoff frequency. However, a high performance filter is expensive and a low cutoff frequency compounds the delay caused by the filter. Therefore, the delay circuit for delaying an input signal must have high performance. One approach for relaxing the requirements for the performance of the low-pass filter 202 is to generate a pulse having a waveform including less high frequency components from the pulse generation portion 201, i.e., to generate a smooth pulse signal (PAM wave, staircase). A description will now be made on a circuit for generating such a staircase pulse signal including less high frequency components.

Figure 10:
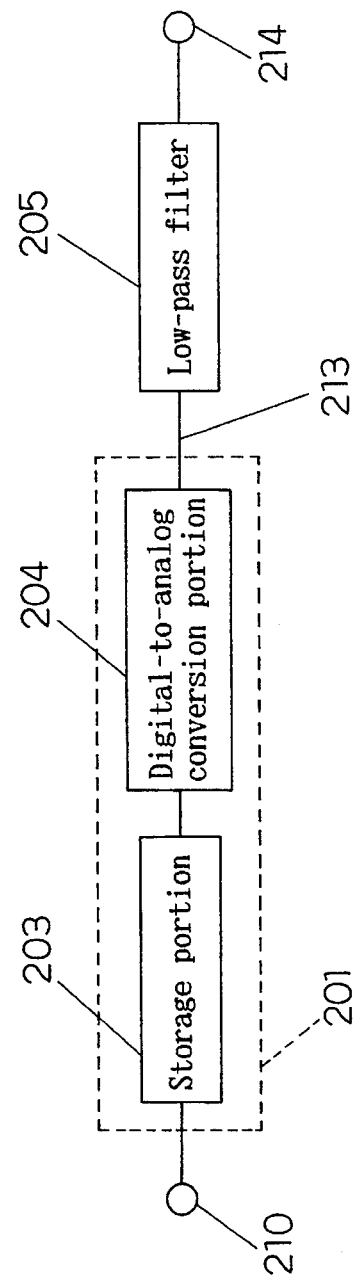
FIG. 10 is a block diagram showing an example of a configuration of a pulse generation circuit for generating a staircase pulse signal.

FIG. 10 is a block diagram showing an example of a configuration of a pulse generation circuit for generating a PAM (staircase) pulse signal.

In FIG. 10, 203 designates a storage portion in which data for pulse waveforms are stored; 204 designates a digital-to-analog conversion portion; 205 designates a low-pass filter; 213 designates a staircase pulse signal which is the output of the digital-to-analog conversion portion 204; 214 designates the output of the low-pass filter; and the storage portion 203 and the digital-to-analog conversion portion 204 constitute the pulse generation portion 201 shown in FIG. 9. 210 designates an input of the pulse generation portion similar to that in FIG. 9.

The operation of this pulse generation circuit will now be described.

Figure 16:
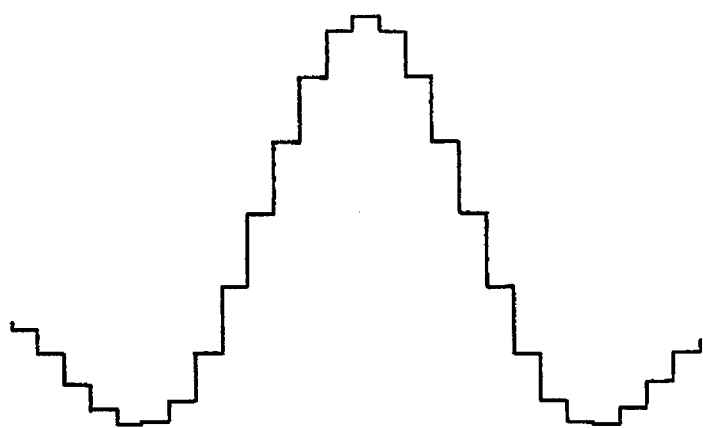
FIG. 16 is a diagram showing a waveform of 213 in FIG. 10.
Figure 17:
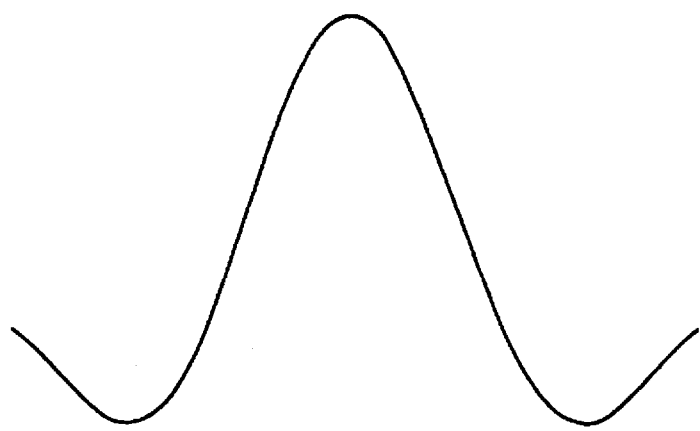
FIG. 17 is a diagram showing a waveform of 214 in FIG. 10.

First, the storage portion 203 stores the waveform data of a staircase pulse signal including less high frequency components calculated in advance, and the output of the detection circuit or peak detection circuit in the previous embodiments is input to this storage portion 203 as the input 210 of the pulse generation portion. Then, the storage portion 203 generates the waveform data of the staircase pulse signal. The waveform data of the staircase pulse signal is digital-to-analog-converted by the digital-to-analog conversion portion 204 into the staircase pulse signal 213 (See FIG. 16). The low-pass filter 205 removes high frequency components from the staircase pulse signal 213 to provide a pulse signal which does not affect the input signal as the output 214 (See FIG. 17) of the low-pass filter. The low-pass filter 205 for removing high frequency components does not need to have performance as high as that of the above-described low-pass filter 202 because the staircase pulse signal 213 includes little high frequency components by nature.

Since waveform data are stored in advance in the storage portion 203 in this pulse generation circuit, it is possible to easily generate a plurality of pulse signals of different polarities or magnitude by calculating and storing the data of the waveforms thereof in advance. In this case, however, it must be possible to distinguish the waveform data output by the detection circuit or peak detection circuit in the above-described embodiments. This circuit has another advantage in that modifications can be easily made by rewriting the waveform data in the storage portion 203.

Figure 11:
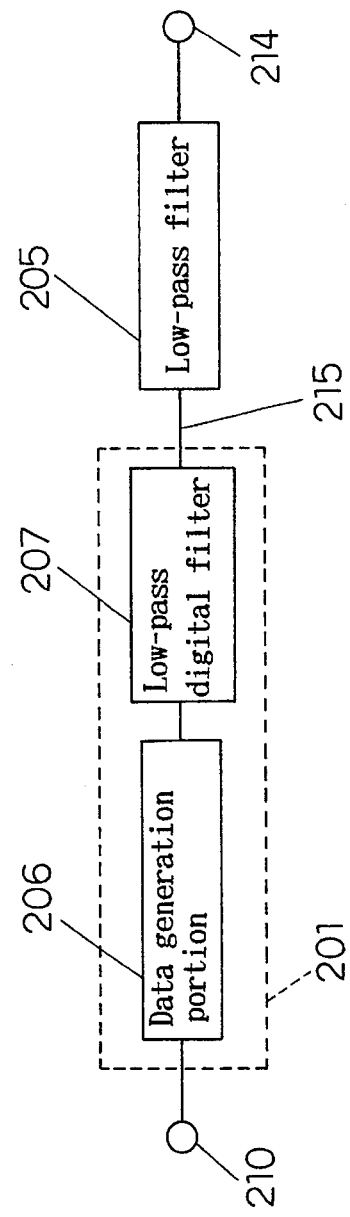
FIG. 11 is a block diagram showing an example of another configuration of a pulse generation circuit for generating a staircase pulse signal.

FIG. 11 is a block diagram showing an example of another configuration of a pulse generation circuit for generating a staircase pulse signal.

Figure 18:
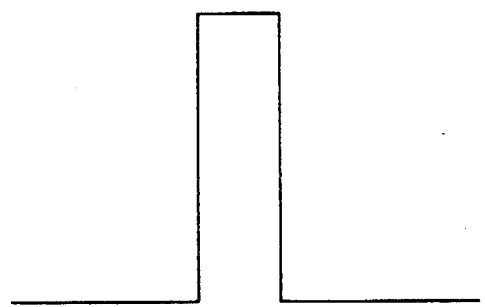
FIG. 18 is a diagram showing a output waveform from 206 in FIG. 11.
Figure 19:
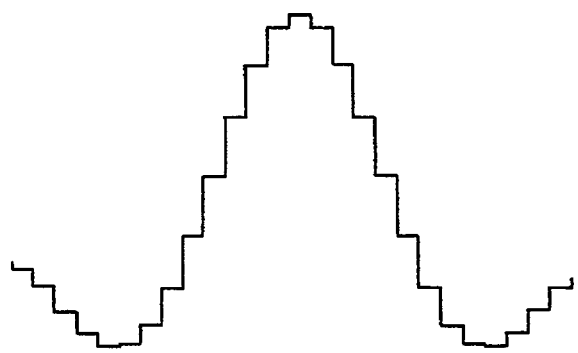
FIG. 19 is a diagram showing a waveform of 215 in FIG. 11.

In FIG. 11, 206 designates a data generation portion for generating pulse waveform data (See FIG.18); 207 designates a low-pass digital filter; 205 designates a low-pass filter; and 215 designates an output of the digital filter (See FIG. 19). The generation portion 206 and the low-pass digital filter 207 constitute the pulse generation portion 201 shown in FIG. 9. Like reference numbers designate parts identical to those in FIG. 9 and FIG. 10.

The operation of this pulse generation circuit will now described.

Figure 20:
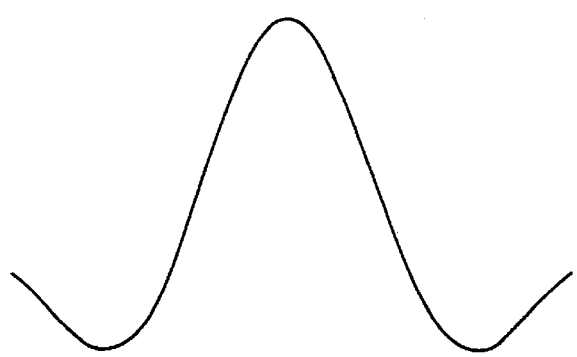
FIG. 20 is a diagram showing a waveform of 214 in FIG. 11.

When the output of the detection circuit or peak detection circuit in the above-described embodiment is input to the data generation portion 206 as the input 210 of the pulse generation portion, the data generation portion 206 generates the waveform data of a pulse signal. The waveform data are subjected to digital signal processing at the low-pass digital filter 207 and are output as the digital filter output 215 (See FIG. 19 ) which is a staircase pulse signal. High frequency components of the digital filter output 215 are removed by the low-pass filter 205 to provide a pulse signal which does not affect the input signal as the low-pass filter output 214 (See FIG. 20). The low-pass filter 205 does not need to have performance as high as that of the above-described low-pass filter 202 because the digital filter output 215 includes little high frequency components by nature. Since the low-pass digital filter 207 removes high frequency components, the data generation portion 206 is required only to generate the waveform data of a rectangular pulse signal, i.e., one item of digital data representing the magnitude of the waveform for the period of the pulse signal.

If the waveform data and the digital signal processing are based on the same calculation method as for the data stored in the storage portion 203, the staircase pulse signal 213 and the digital filter output 215 will be of course identical.

In this pulse generation circuit, the data generation portion 206 needs only to output the waveform data of a rectangular pulse signal. It is therefore possible to easily generate a plurality of pulse signals of different polarities and magnitude. There is another advantage in that a change in the magnitude or the like of a pulse signal can be made very simply because it is required only to change one item of the waveform data.

The description of the pulse generation circuits shown in FIG. 9, FIG. 10 and FIG. 11 has been made on the assumption that a pulse signal of one polarity and fixed magnitude is generated. The same circuit configuration may be employed to generate a bipolar pulse signal, a variable peak pulse signal or both of them. Especially, the pulse generation circuits shown in FIG. 10 and FIG. 11 can be easily adapted to any of such pulse signals as already described in the respective parts of this specification by simply adapting the circuit to the signals from the detection circuit and peak detection circuit. In the case of the pulse generation circuit shown in FIG. 9, since it is based on the assumption that unipolar pulses of fixed magnitude are generated, when a bipolar pulse signal and a variable peak pulse signal are generated, it is necessary to operate pulse generating portions adapted to the respective pulse signals in parallel. In such a case, therefore, the configurations of the pulse generation circuits in FIG. 10 and FIG. 11 are suitable.

Figure 12:
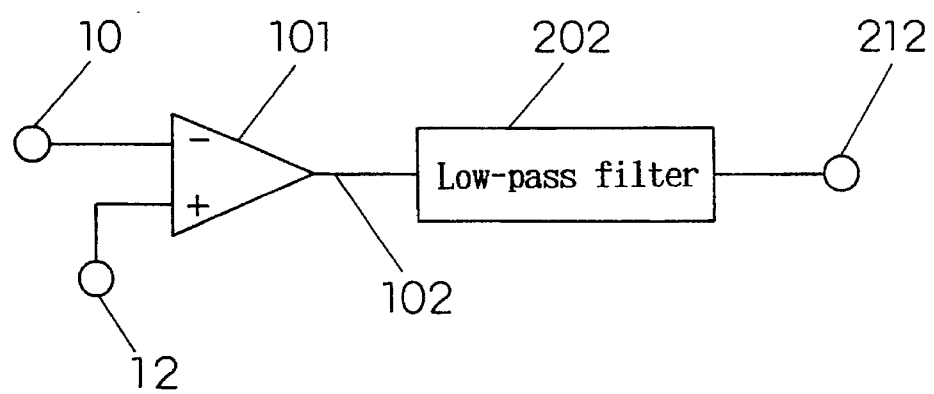
FIG. 12 is a block diagram showing an example of a configuration wherein a comparator is used as a detection circuit and a pulse generation circuit.

As the detection circuit in the above-described embodiments, a comparator for comparing the magnitude of two inputs may be used. FIG. 12 is a block diagram showing a configuration of a detection circuit and a pulse generation circuit wherein such a comparator is used.

In FIG. 12, 101 designates a comparator; 102 designates a rectangular pulse signal which is an output of the comparator 101; 12 designates a reference input of the comparator 101; and like reference numbers designate parts identical to those in the above-described embodiments.

The operation will now be described.

When an input signal 20 falls below the reference input 12 of the comparator 101, the comparator 101 generates the rectangular pulse signal 102 of the positive polarity. The low-pass filter 202 removes high frequency components of this rectangular pulse signal 102 and outputs a desired pulse signal 212.

In this circuit, the comparator 101 performs both of the detection and the generation of the rectangular pulse signal 102 which is the original signal of the pulse signal, thereby allowing a desired pulse signal to be obtained with a very simple configuration. The pulse width of the rectangular pulse signal 102 is determined by the input signal 10 in this circuit. If there is any problem caused by a change in the pulse width, the comparator 101 may be added with the function of a multivibrator which generates a rectangular signal having an always constant pulse width.

As the peak detection circuit, a circuit including a comparator for detecting the peak of an input signal and a peak hold circuit capable of detecting the value of the peak may be used. A signal exceeding a set value is detected by the comparator and, at the same time, the peak hold circuit detects the value of the peak and outputs such information to a pulse generation circuit. The pulse generation circuit can generate a pulse signal having magnitude in accordance with the information.

Figure 13:
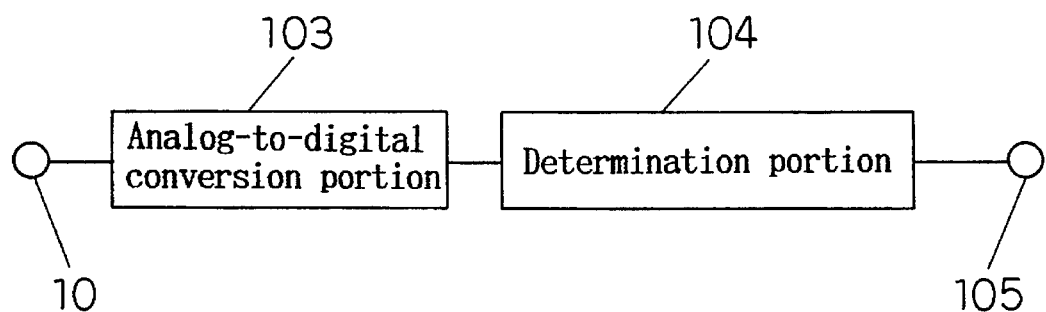
FIG. 13 is a block diagram showing an example of a configuration of a peak detection circuit for detecting a peak by the use of A/D conversion.

The peak detection circuit may be implemented in another way wherein an input signal is analog-to-digital converted to detect the peak thereof. FIG. 13 is a block diagram of a peak detection circuit showing an example of this method.

In FIG. 13, 103 designates an analog-to-digital conversion portion; 104 designates a determination portion; 105 designates a determination output of the determination portion 104; and 10 designates an input signal.

The analog-to-digital conversion portion 103 is functionally comprised of a plurality of comparators having different detection thresholds and performs analog-to-digital conversion depending when an input exceeds the detection threshold of any converter. The determination portion 104 can determine that the input signal 10 has exceeded and, at the same time, can determine the peak value of the input signal 10 from the data output by the analog-to-digital conversion portion 103. When the determination circuit 104 determines that the input signal 10 has exceeded the set value, it obtains the peak value from the data output by the analog-to-digital conversion portion 103 and outputs information on the polarity and magnitude of the pulse signal to be output to a pulse generation circuit as the determination output 105.

The method wherein an input signal is analog-to-digital-converted to detect the peak thereof provides an advantage not only in that all the processes after the analog-to-digital conversion can be performed as digital signal processing but also in that interface with a pulse generation circuit can be easily provided especially when the pulse generation circuit is constituted by a digital circuit.

As described above, the present invention makes it possible to prevent clipping caused by the characteristics of a light source or to reduce the level of such clipping. As a result, it is possible to prevent or suppress increase in distortion and digital errors during digital modulation due to clipping, thereby improving the performance of a light transmitter.

Although the description has been made on a light transmitter which drives a light source having nonlinearity and transmits an optical output, the improvement in performance obtained by the electrical circuit for driving the light source (e.g., the portion formed by the detection circuit 1, pulse generation circuit 2, delay circuit 3 and addition circuit 4 in FIG. 1 which is hereinafter referred to as peak compression circuit) is not limited to the driving of a light source.

For example, assume that an electrical amplifier is connected downstream of such a peak compression circuit, i.e., the electrical amplifier is to be driven by the peak compression circuit. In general, the greater the amplitude of a signal input to an electrical amplifier, the greater the magnitude of distortion caused by nonlinearity of the electrical amplifier. The magnitude of distortion rapidly increases when it exceeds a certain threshold. It is therefore necessary to make the magnitude of a signal input to an electrical amplifier somewhat small from the viewpoint of distortion characteristics. In the case that the signal is a frequency division multiplexed signal or a multiplexed signal of spread spectrum signals, the peak signal amplitude thereof is very much greater than the average signal amplitude. Therefore, in order to amplify such a signal with small distortion, it is necessary to use an electrical amplifier having a very large dynamic range which allows the peak of the signal to be amplified without distortion. However, since such an electrical amplifier requires high bias current, it is expensive in general because of large power consumption and sophisticated techniques required for manufacture of the same.

The use of the peak compression circuit of the present invention as described above allows the amplitude of the peak of a signal to be compressed, making it possible to use an electrical amplifier having a smaller dynamic range, i.e., an electrical amplifier of small power consumption and low cost as the electrical amplifier downstream of this signal compression circuit.

While this invention has been described with respect to the preferred embodiments thereof, it will be understood by those skilled in the art that various changes in detail may be made therein without departing from the spirit and scope of the invention as defined in the appended claims.

What is claimed is:

1. A peak compression circuit comprising:

detection means for detecting that a value of an input signal has exceeded a predetermined set value;

pulse generation means for generating, based on the result of the detecting of the detection means, a pulse signal constituted of frequency components which do not substantially adversely affect said input signal and having a polarity in a direction of reducing portions of the input signal exceeding said predetermined set value;

delay means for delaying said input signal so that there is a phase match between the generated pulse signal and the portions of the input signal exceeding the predetermined set value; and addition means for adding the delayed input signal and said pulse signal.

2. A peak compression circuit according to claim 1, wherein:

the detection means includes a peak detection means for detecting a peak value of said input signal when it is detected that the value of said input signal exceed the predetermined set value and where in the pulse signal generated by said pulse generating means is a pulse signal having a peak value corresponding to said detected peak value.

3. The peak compression circuit according to claim 1, wherein the detection means and said pulse generation means comprise a comparator for comparing said input signal and said predetermined set value and for outputting a rectangular original pulse signal as the result of the comparison and a low-pass filter for removing frequency components which adversely affect said input signal from the output original pulse signal.

4. The peak compression circuit according to claim 1, wherein the detection means includes an analog-to-digital conversion portion for performing analog-to-digital conversion on said input signal and a determination portion for detecting that the data output by the analog-to-digital conversion portion have exceeded said predetermined set value and for detecting the peak value thereof.

5. A peak compression circuit as recited in claim 1, further including a light transmitter comprising a signal output means for outputting an intensity-modulated signal based on a signal obtained by the addition performed by the addition means.

6. The peak compression circuit according to claim 5, wherein the signal output means is a light signal output means for outputting an intensity-modulated light signal.

7. The peak compression circuit according to claim 6, wherein the light signal output means includes an unmodulated light source portion for outputting unmodulated light and a light modulation portion for modulating the unmodulated light.

8. The peak compression circuit according to claim 6, wherein the light signal output means is a semiconductor laser.

9. The peak compression circuit according to claim 8, wherein said predetermined set value of the detection means is one of (a) the threshold of said semiconductor laser and (b) a value corresponding to the threshold and wherein said pulse generation means generates the pulse signal which causes modulating current input to said semiconductor laser to exceed said threshold.

10. The peak compression circuit according to claim 8, wherein said predetermined set value of the detection means is one of (a) the threshold of said semiconductor laser and (b) a value corresponding to the threshold and wherein said pulse generation means generates the pulse signal which reduces the amplitude of the portion of the modulating current input to said semiconductor laser which has exceeded said predetermined set value.

11. A peak compression circuit comprising:

a detection means for detecting that a value of an input signal has exceed a predetermined set value;

a pulse generation means for generating, based on the result of detecting of the detection means, a pulse signal constituted of frequency components which do not substantially adversely affect said input signal and having a polarity in a direction of reducing portions of the input signal exceeding said predetermined set value;

a delay means for delaying said input signal so that there is a phase match between the generated pulse signal and the portions of the input signal exceeding the predetermined set value; and an addition means for adding the delayed input signal and said pulse signal, wherein the predetermined set value is provided for each of the polarities of said input signal.

12. A peak compression circuit comprising:

a detection means for detecting that a value of an input signal has exceeded a predetermined set value;

a pulse generation means for generating, based on the result of the detecting of the detection means, a pulse signal constituted of frequency components and having a polarity in a direction of reducing portions of the input signal exceeding said predetermined set value which do not substantially adversely affect said input signal;

a delay means for delaying said input signal so that there is a phase match between the generated pulse signal and the portions of the input signal exceeding the predetermined set value; and an addition means for adding the delayed input signal and said pulse signal, wherein the predetermined set value is provided for each of the polarities of said input signal and wherein the detection means includes a peak detection means for detecting a peak value of said input signal when it is detected that the value of said input signal has exceeded the predetermined set value and wherein the pulse signal generated by said pulse generating means is a pulse signal having a peak value corresponding to said detected peak value.

13. A peak compression circuit comprising:

detection means for detecting that a value of an input signal has exceeded a predetermined set value;

pulse generation means for generating, based on the result of the detecting of the detection means, a pulse signal constituted of frequency components which do not substantially adversely affect said input signal and having a polarity in a direction of reducing portions of the input signal exceeding said predetermined set value;

delay means for delaying said input signal so that there is a phase match between the generated pulse signal and the portions of the input signal exceeding the predetermined set value; and addition means for adding the delayed input signal and said pulse signal, wherein the input signal is one of (a) a frequency division multiplexed signal and (b) a multiplexed signal of spread spectrum signals.

14. The peak compression circuit according to claim 13, wherein the original pulse signal is a staircase signal which has been subjected to digital signal processing for removing frequency components which adversely affect said input signal.

15. The peak compression circuit according to claim 13, wherein the pulse generating portion includes a storage portion for storing digital data representing the waveform of said original pulse signal and a digital-to-analog conversion portion for performing digital-to-analog conversion on the digital data from the storage portion.

16. The peak compression circuit according to claim 13, wherein the pulse generating portion includes a pulse signal data generating portion for generating pulse signal data and a low-pass digital filter for performing digital signal processing on the generated pulse signal data to remove frequency components which adversely affect said input signal.

17. A peak compression circuit comprising:
- a detection means for detecting that a value of an input signal has exceeded a predetermined set value;
- a pulse generation means for generating, based on the result of the detection means, a pulse signal constituted of frequency components which do not substantially adversely affect said input signal and having a polarity in a direction of reducing portions of the input signal exceeding said predetermined set value;
- a delay means for delaying said input signal so that there is a phase match between the generated pulse signal and the portions of the input signal exceeding the predetermined set value; and
- an addition means for adding the delayed input signal and said pulse signals wherein
- the pulse generation means includes a pulse generating portion for generating a one-shot rectangular original pulse signal and a filter for removing frequency components which adversely affect said input signal form the generated original pulse signal.

18. The peak compression circuit according to claim 17, wherein the original pulse signal is a staircase signal which as been subjected to digital signal processing for removing frequency components which adversely affect said input signal.

19. The peak compression circuit according to claim 17, wherein the pulse generating portion includes a storage portion for storing digital data representing the waveform of said original pulse signal and a digital-to-analog conversion portion for performing digital-to-analog conversion on the digital data from the storage portion.

20. The peak compression circuit according to claim 17, wherein the pulse generating portion includes a pulse signal data generating portion for generating pulse signal data and a low-pass digital filter for performing digital signal processing on the generated pulse signal data to remove frequency components which adversely affect said input signal.

21. A peak compression circuit as recited in claim 17, further including a light transmitter comprising a signal output means for outputting an intensity-modulated signal based on a signal obtained by the addition performed by the addition means.

22. The peak compression circuit according to claim 21 wherein the signal output means is a light signal output means for outputting an intensity-modulated light signal.

23. The peak compression circuit according to claim 22, wherein the light signal output means includes an unmodulated light source portion for outputting unmodulated light and a light modulation portion for modulating the unmodulated light.

24. The peak compression circuit according to claim 22, wherein the light signal output means is a semiconductor laser.

25. The peak compression circuit according to claim 24, wherein said predetermined set value of the detection means is one of (a) the threshold of said semiconductor laser and (b) a value corresponding to the threshold and wherein said pulse generation means generates the pulse signal which causes modulating current input to said semiconductor laser to exceed said threshold.

26. The peak compression circuit according to claim 24, wherein said predetermined set value of the detection means is one of (a) the threshold of said semiconductor laser and (b) a value corresponding to the threshold and wherein said pulse generation means generates the pulse signal which reduces the amplitude of the portion of the modulating current input to said semiconductor laser which has exceeded said predetermined value.

\* \* \* \* \*

UNITED STATES PATENT AND TRADEMARK OFFICE
CERTIFICATE OF CORRECTION

PATENT NO. : 5,519,530
DATED : May 21, 1996
INVENTOR(S) : Kuniaki Utsumi

It is certified that error appears in the above-indentified patent and that said Letters Patent is hereby corrected as shown below:

In Claim 2, column 15, line 11, the word "exceed" should be --has exceeded--.

In Claim 11, at column 15, line 64, the word "exceed" should be --exceeded--.

In Claim 17, column 17, line 28, delete "form" and insert therefor --from--.

In Claim 18, at column 17, line 32, delete "as" and insert therefore --has--.

Signed and Sealed this

Eighteenth Day of March, 1997

Attest:

BRUCE LEHMAN

*Attesting Officer*  *Commissioner of Patents and Trademarks*